(12) United States Patent
Tseng et al.

(10) Patent No.: US 11,881,171 B2
(45) Date of Patent: Jan. 23, 2024

(54) ELECTRONIC DEVICE

(71) Applicant: Innolux Corporation, Miaoli County (TW)

(72) Inventors: Ming-Chun Tseng, Miaoli County (TW); Kung-Chen Kuo, Miaoli County (TW); Lien-Hsiang Chen, Miaoli County (TW); Yong-Zhi Liu, Miaoli County (TW); Po-Syun Chen, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 17/984,216

(22) Filed: Nov. 9, 2022

(65) Prior Publication Data

US 2023/0186852 A1 Jun. 15, 2023

Related U.S. Application Data

(60) Provisional application No. 63/287,546, filed on Dec. 9, 2021.

(30) Foreign Application Priority Data

Sep. 29, 2022 (CN) .......................... 202211202545.1

(51) Int. Cl.
*G09G 3/3233* (2016.01)
(52) U.S. Cl.
CPC ... *G09G 3/3233* (2013.01); *G09G 2300/0833* (2013.01)

(58) Field of Classification Search
CPC ........ H10K 59/00–95; H01L 27/14609; H04N 25/59; H04N 25/587; H04N 25/778;
(Continued)

(56) References Cited

U.S. PATENT DOCUMENTS 6,331,844 B1 12/2001 Okumura et al.
2014/0062992 A1* 3/2014 Yen ...................... G09G 3/3659
345/212

(Continued)

FOREIGN PATENT DOCUMENTS

CN 108962147 A * 12/2018 ........... G09G 3/3266
CN 111338879 6/2020
(Continued)

OTHER PUBLICATIONS

"Search Report of Europe Counterpart Application", dated Apr. 28, 2023, p. 1-p. 9.
(Continued)

*Primary Examiner* — Sanjiv D. Patel
(74) *Attorney, Agent, or Firm* — JCIPRNET

(57) ABSTRACT

An electronic device including a substrate and a pixel circuit is provided. The substrate includes an active area and a peripheral area. The peripheral area is adjacent to the active area. The pixel circuit is disposed in the active area on the substrate. The pixel circuit includes an amplifier circuit and a tunable element. The amplifier circuit includes a non-inverting input terminal, an inverting input terminal, and an output terminal. The output terminal is electrically connected to the inverting input terminal, so that the amplifier circuit is a negative feedback circuit. The tunable element is electrically connected to the output terminal of the amplifier circuit.

17 Claims, 4 Drawing Sheets

(58) Field of Classification Search
CPC .. H04N 5/7441; H04N 25/77; G09G 2300/08; G09G 2300/0876; G09G 2320/045; G09G 3/32; G09G 2310/0256; G09G 2310/0251; G09G 2300/0852; G09G 3/3677; G09G 3/325; G09G 3/3233; G09G 2320/043; G09G 2300/0833; H03G 1/0064; H03G 1/0052; H03G 2201/502
See application file for complete search history.

(56) References Cited

U.S. PATENT DOCUMENTS

| | | | |
|---|---|---|---|
| 2015/0169136 A1* | 6/2015 | Ganti | G06F 3/0436 345/177 |
| 2021/0225257 A1 | 7/2021 | Tsai et al. | |

FOREIGN PATENT DOCUMENTS

| | | |
|---|---|---|
| TW | 202044775 | 12/2020 |
| TW | 202141904 | 11/2021 |

OTHER PUBLICATIONS

"Office Action of Taiwan Counterpart Application", dated Aug. 4, 2023, p. 1-p. 4.

* cited by examiner

ELECTRONIC DEVICE

CROSS-REFERENCE TO RELATED APPLICATION

This application claims the priority benefits of U.S. provisional application Ser. No. 63/287,546, filed on Dec. 9, 2021 and Chinese application no. 202211202545.1, filed on Sep. 29, 2022. The entirety of each of the above-mentioned patent applications is hereby incorporated by reference herein and made a part of this specification.

BACKGROUND

Technical Field

The disclosure relates to an electronic device. In particular, the disclosure relates to an electronic device including a tunable element.

Description of Related Art

Conventionally, when a diode in a tunable element operates at a reverse bias voltage, there is an unstable voltage across the diode, resulting in variation of the equivalent capacitance.

SUMMARY

The disclosure provides an electronic device, in which there may be a stable voltage across a diode in a tunable element, and variability of the equivalent capacitance may be reduced.

An electronic device of an embodiment of the disclosure includes a substrate and a pixel circuit. The substrate includes an active area and a peripheral area. The peripheral area is adjacent to the active area. The pixel circuit is disposed in the active area on the substrate. The pixel circuit includes an amplifier circuit and a tunable element. The amplifier circuit includes a non-inverting input terminal, an inverting input terminal, and an output terminal. The output terminal is electrically connected to the inverting input terminal, so that the amplifier circuit is a negative feedback circuit. The tunable element is electrically connected to the output terminal of the amplifier circuit.

An electronic device of an embodiment of the disclosure includes an amplifier circuit and a tunable element. The amplifier circuit includes a non-inverting input terminal, an inverting input terminal, and an output terminal. The output terminal is electrically connected to the inverting input terminal, so that the amplifier circuit is a negative feedback circuit. The tunable element is electrically connected to the output terminal of the amplifier circuit.

To make the aforementioned more comprehensible, several embodiments accompanied with drawings are described in detail as follows.

DESCRIPTION OF THE EMBODIMENTS

Figure 1:
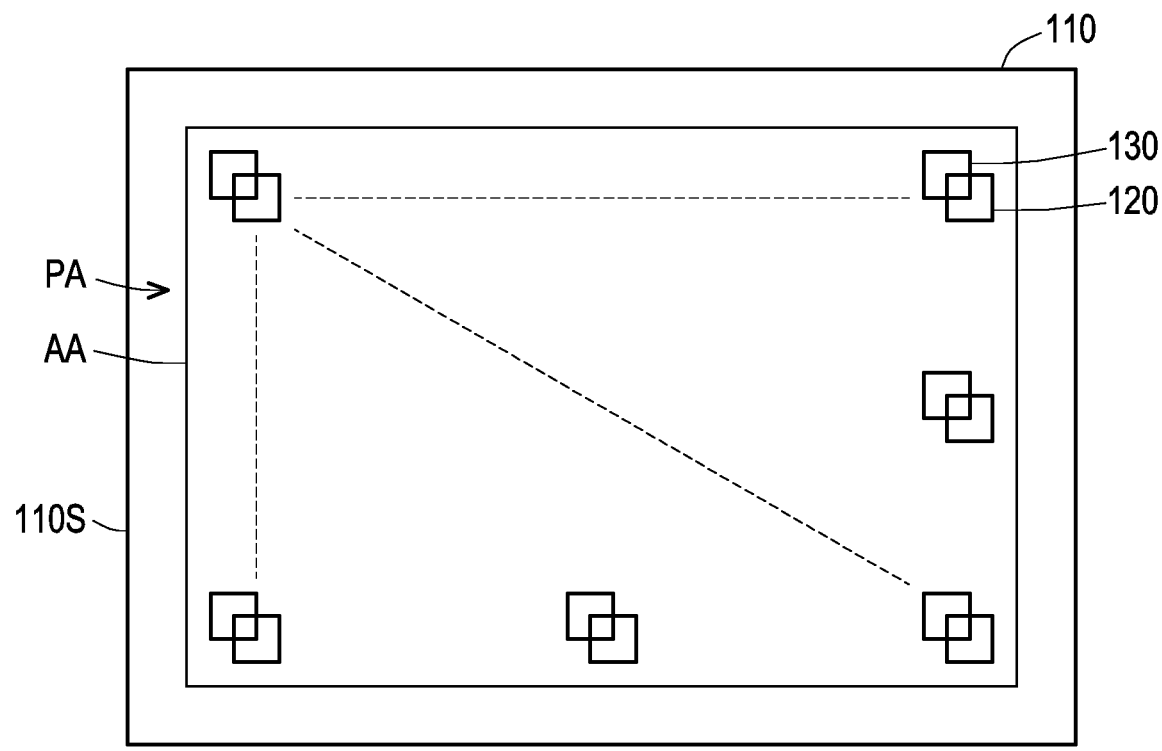
FIG. 1 is a schematic block diagram showing an electronic device of an embodiment of the disclosure.

The disclosure may be understood with reference to the following detailed description together with the accompanying drawings. It should be noted that, for ease of understanding by readers and clarity of the drawings, a plurality of drawings in the disclosure merely show a part of an electronic device, and specific elements in the drawings are not drawn to scale. In addition, the number and size of elements in the drawings only serve for exemplifying instead of limiting the scope of the disclosure.

In the following description and claims, terms such as "include" and "comprise" are open-ended terms, and thus should be interpreted as "including, but not limited to".

It should be understood that although terms such as first, second, third, etc. may be used to describe diverse constituent elements, constituent elements are not limited by the terms. The terms are used only to discriminate one constituent element from other constituent elements in the description. Instead of using the same terms in the claims, the terms first, second, third, etc. may be used in place in accordance with the order of claiming an element. Accordingly, in the following description, a first constituent element may be a second constituent element in the claims.

In some embodiments of the disclosure, terms related to bonding and connection such as "connection", "interconnection", etc., unless specifically defined, may indicate the case where two structures are in direct contact, or where two structures are not in direct contact and other structures are disposed in between. Moreover, such terms related to bonding and connection may also encompass the case where two structures are both movable or where two structures are both fixed. In addition, the term "couple" includes any direct and indirect electrical connection means. In the case of direct electrical connection, endpoints of elements on two circuits are directly connected or connected to each other by a conductor line segment. In the case of indirect electrical connection, there are switches, diodes, capacitors, inductors, resistors, other suitable elements, or a combination of the above elements between endpoints of elements on two circuits, but not limited thereto.

The electronic device of the disclosure may include, but is not limited to, a display device, an antenna device, a sensing device, a light-emitting device, or a tiled device. The electronic device may include a bendable or flexible electronic device. The electronic device may include an electronic component. The electronic device may include a liquid crystal layer or a light-emitting diode, for example. The electronic device may include, but is not limited to, a passive element and an active element, such as a capacitor, a resistor, an inductor, a varactor, a filter, a diode, a transistor, a sensor, microelectromechanical systems (MEMS), a liquid crystal chip, or a controller. The diode may include a light-emitting diode or a photodiode. The light-emitting diode may include, for example but not limited to, an organic light-emitting diode (OLED), a mini LED, a micro LED, or a quantum dot LED, fluorescence, phosphor, other suitable materials, or a combination thereof. The sensor may include, for example but not limited to, a capacitive sensor, an optical sensor, an electromagnetic sensor, a fingerprint sensor (FPS), a touch sensor, an antenna, or a pen sensor. The controller may include, for example but not limited to, a timing controller. Hereinafter, a display device will be taken as the electronic device to describe the disclosure, but the disclosure is not limited thereto.

Reference will now be made in detail to the exemplary embodiments of the disclosure, examples of which are illustrated in the accompanying drawings. Wherever possible, the same reference numerals are used in the drawings and the description to refer to the same or like parts.

Figure 2:
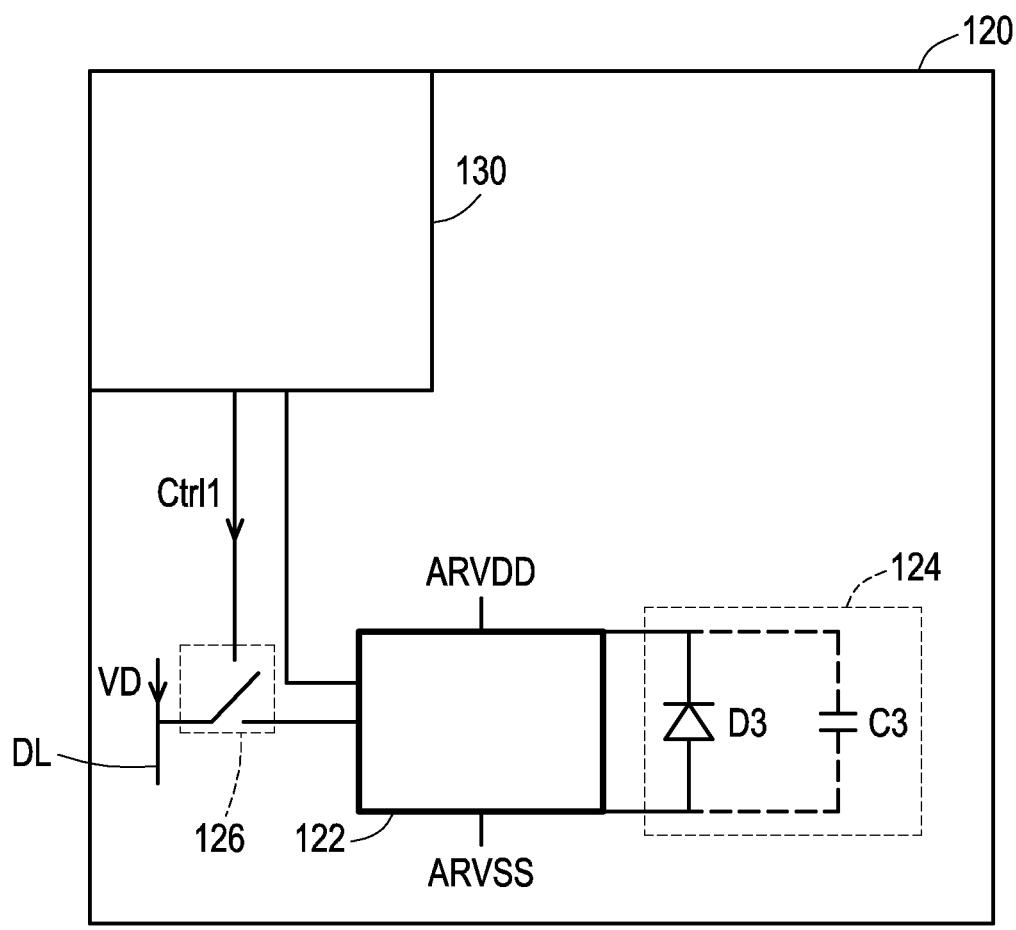
FIG. 2 is a schematic block diagram showing the pixel circuit of the embodiment of FIG. 1.

FIG. 1 is a schematic block diagram showing an electronic device of an embodiment of the disclosure. FIG. 2 is a schematic block diagram showing the pixel circuit of the embodiment of FIG. 1. With reference to FIG. 2, an electronic device 100 includes an amplifier circuit 122 and a tunable element 124. The amplifier circuit 122 includes a non-inverting input terminal IN1, an inverting input terminal IN2, and an output terminal OUT. According to some embodiments, the output terminal OUT of the amplifier circuit 122 is electrically connected to the inverting input terminal IN2, so that the amplifier circuit 122 is a negative feedback circuit. The tunable element 124 is electrically connected to the output terminal OUT of the amplifier circuit 122.

According to some embodiment, with reference to FIG. 1 and FIG. 2, the electronic device 100 includes a substrate 110 and a pixel circuit 120. The substrate 110 includes an active area AA and a peripheral area PA. The peripheral area PA is adjacent to the active area AA. The pixel circuit 120 is disposed in the active area AA on the substrate 110. The active area AA may, for example, be provided at a central position of the substrate 110. The peripheral area PA may, for example, be disposed at an edge position of the substrate 110 (and the disclosure is not limited thereto). To be specific, the peripheral area PA may be closer to a side 110S of the substrate 110 than the active area AA is. The active area AA may be an area where electromagnetic waves are emitted and received.

According to some embodiments, as shown in FIG. 1, the electronic device 100 includes a substrate 110, pixel circuits 120, and driving circuits 130. The substrate 110 includes the active area AA and the peripheral area PA. The peripheral area PA is adjacent to the active area AA. The pixel circuits 120 and the driving circuits 130 are disposed in the active area AA on the substrate 110. The driving circuits 130 are respectively configured to drive the pixel circuits 120.

As shown in FIG. 2, the pixel circuit 120 includes an amplifier circuit 122 and a tunable element 124. The amplifier circuit 122 operates between a first operating voltage ARVDD and a second operating voltage ARVSS, for example. The tunable element 124 is represented by an equivalent circuit of a diode D3 and a junction capacitor C3 thereof. The tunable element 124 may include a diode D3. The tunable element 124 may be a communication element in this embodiment. The tunable element 124 may be, for example, a varactor, a radio frequency component, or a radio frequency radiation element. The disclosure does not limit the type of the tunable element 124. According to some embodiments, specific parameters (e.g., physical parameters) of the tunable element may be adjusted depending on the applied signal. The specific parameters may include a capacitance, an inductance, a resistance, a dielectric constant, or a combination thereof, for example.

As shown in FIG. 2, the electronic device 100 includes a data line DL and a first control element 126. The pixel circuit 120 is coupled to the data line DL through the first control element 126. The driving circuit 130 is configured to output at least one control signal Ctrl1 to control the conduction state of the first control element 126. The first control element 126 is configured to receive a data voltage VD provided by the data line DL. The data voltage VD may be input to the amplifier circuit 122 when the first control element 126 is turned on.

Figure 3A:
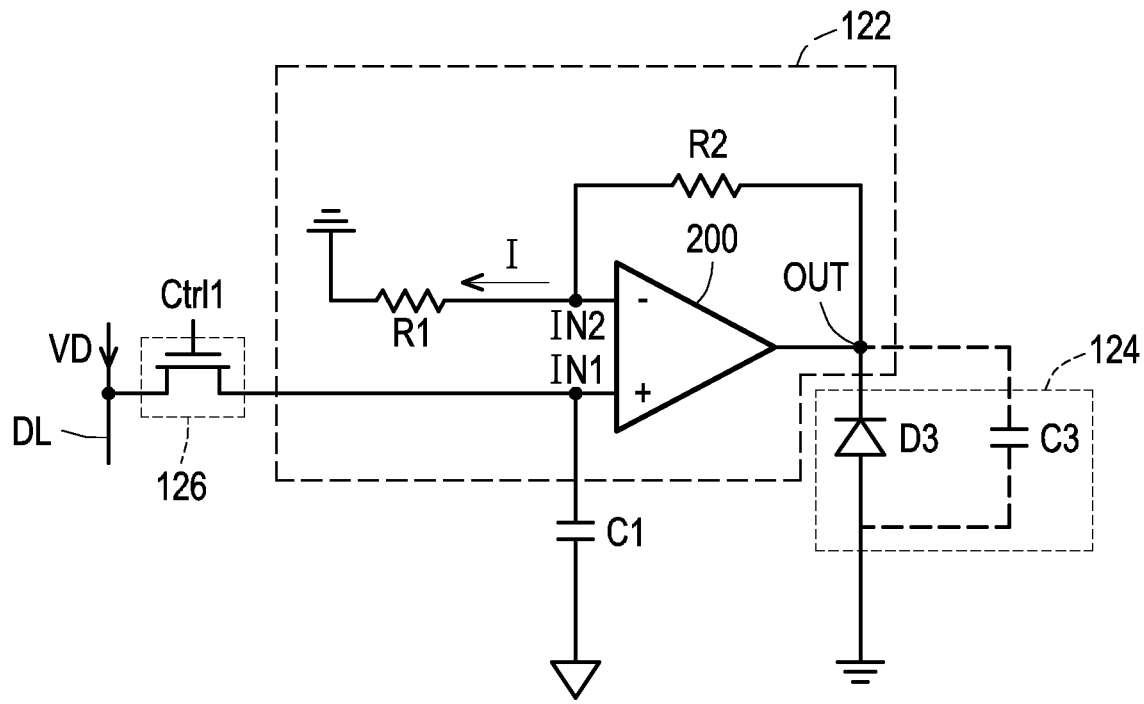
FIG. 3A is a schematic block diagram showing a pixel circuit of an embodiment of the disclosure.

FIG. 3A is a schematic block diagram showing a pixel circuit of an embodiment of the disclosure. According to some embodiments, as shown in FIG. 2, the pixel circuit 120 includes the amplifier circuit 122 and the tunable element 124. The amplifier circuit 122 includes a non-inverting input terminal IN1, an inverting input terminal IN2, and an output terminal OUT. The output terminal OUT is electrically connected to the inverting input terminal IN2, so that the amplifier circuit 122 is a negative feedback circuit. The tunable element 124 is electrically connected to the output terminal OUT of the amplifier circuit 122. The pixel circuit 120 includes the amplifier circuit 122, the tunable element 124, the first control element 126, and a first storage capacitor C1. The first storage capacitor C1 may be electrically connected between the first control element 126 and the amplifier circuit 122. The amplifier circuit 122 includes an amplifier 200 and resistors R1 and R2. The amplifier 200 includes the non-inverting input terminal IN1, the inverting input terminal IN2, and the output terminal OUT. One terminal of the resistor R1 is coupled to a ground voltage, and another terminal of the resistor R1 is coupled to the inverting input terminal IN2. One terminal of the resistor R2 is coupled to the inverting input terminal IN2, and another terminal of the resistor R2 is coupled to the output terminal OUT. The output terminal OUT is electrically connected to the inverting input terminal IN2 through the resistor R2, so that the amplifier circuit 122 is a negative feedback circuit. The tunable element 124 is electrically connected to the output terminal OUT of the amplifier circuit 120. The first control element 126 is configured to receive the data voltage VD provided by the data line DL. The first storage capacitor C1 is electrically connected between the first control element 126 and the amplifier circuit 122.

Figure 3B:
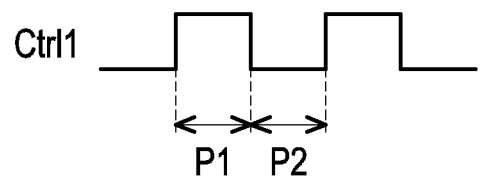
FIG. 3B is a schematic diagram showing a waveform of a control signal of FIG. 3A.

FIG. 3B is a schematic diagram showing a waveform of a control signal of FIG. 3A With reference to FIG. 3A and FIG. 3B, the first control element 126 is controlled by the first control signal Ctrl1. The control signal (the first control signal) Ctrl1 serves to control the conduction state of the first control element 126. The control signal Ctrl1 includes a first period P1 and a second period P2. Taking the first control element 126 including an N-type transistor as an example, the control signal Ctrl1 is at a high level (a first level) and turns on the first control element 126 during the first period P1. Therefore, the data voltage VD may charge the first storage capacitor C1, so that a voltage at the non-inverting input terminal IN1 is equal to the data voltage VD. At this time, a voltage at the inverting input terminal IN2 being another input terminal of the amplifier 200 is also equal to the data voltage VD. The control signal Ctrl1 is at a low level (a second level) and does not turn on the first control element 126 during the second period P2.

As shown in FIG. 3A and 3B, the voltage at the non-inverting input terminal IN1 is the same as the voltage at the inverting input terminal IN2 due to the structure of a negative feedback circuit of the amplifier circuit 122. A current I is determined by the voltage at the inverting input terminal IN2 and the resistor R1, and the voltage at the output terminal is a voltage across the resistor R2 added with the voltage at the inverting input terminal IN2. Therefore, the data voltage VD is amplified and a stable reverse voltage is generated at the output terminal OUT, and the diode D3 in the tunable element 124 operates at a stable reverse voltage. Therefore, the junction of the diode D3 forms a stable reverse-bias capacitor C3, ensuring normal operation of subsequent circuits coupled to the tunable element 124.

Figure 4A:
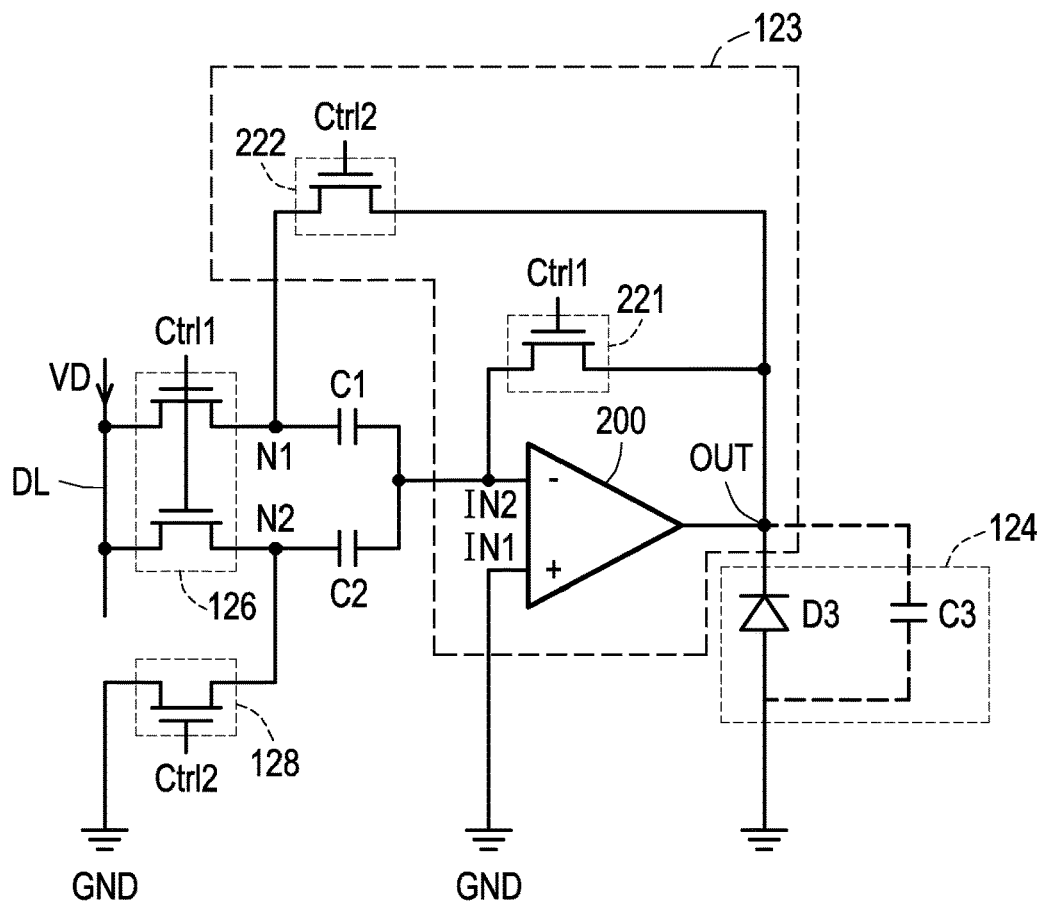
FIG. 4A is a schematic block diagram showing a pixel circuit of another embodiment of the disclosure.
Figure 4B:
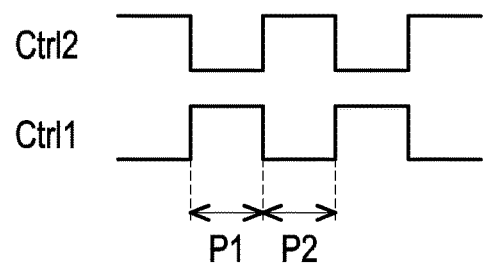
FIG. 4B is a schematic diagram showing waveforms of control signals of FIG. 4A.

FIG. 4A is a schematic block diagram showing a pixel circuit of another embodiment of the disclosure. FIG. 4B is a schematic diagram showing waveforms of control signals of FIG. 4A. An amplifier circuit in FIG. 4A is labeled with a reference numeral 123. The pixel circuit 120 includes an amplifier circuit 123 and the tunable element 124. The amplifier circuit 123 includes a non-inverting input terminal IN1, an inverting input terminal IN2, and an output terminal OUT. The output terminal OUT is electrically connected to the inverting input terminal IN1, so that the amplifier circuit 123 is a negative feedback circuit. Similar to FIG. 3B, the pixel circuit 120 includes the first control element 126 and the first storage capacitor C1. In addition, with reference to FIG. 4A and FIG. 4B, the pixel circuit 120 further includes a second control element 128 and a second storage capacitor C2. The amplifier circuit 123 also has the structure of a negative feedback circuit. The second control element 128 and the non-inverting input terminal IN1 are coupled to a ground voltage GND. The second storage capacitor C2 is electrically connected between the second control element 128 and the amplifier circuit 123. The control signal Ctrl1 serves to control the conduction states of the first control element 126 and a switch element 221. A control signal (a second control signal) Ctrl2 serves to control the conduction states of the second control element 128 and a switch element 222. The first control element 126 is controlled by the first control signal Ctrl1, and the second control element is controlled by the second control signal Ctrl2. The control signal Ctrl1 and the control signal Ctrl2 include the first period P1 and the second period P2.

With reference to FIG. 4A and FIG. 4B, during the first period P1, taking the first control element 126 including an N-type transistor as an example, the control signal Ctrl1 is at a high level (a first level) and turns on the first control element 126 and the switch element 221; and taking the second control element 128 including an N-type transistor as an example, the control signal Ctrl2 is at a low level (a second level) and does not turn on the second control element 128 and the switch element 222. Therefore, the data voltage VD may charge a node N1 of the first storage capacitor C1 and a node N2 of the second storage capacitor C2, so that voltages at the nodes N1 and N2 are equal to the data voltage VD. At this time, since the non-inverting input terminal IN1 is coupled to the ground voltage GND, a voltage at the inverting input terminal IN2 being another input terminal of the amplifier 200 is also equal to the ground voltage GND. In addition, since the switch element 221 is in the ON state, a voltage at the output terminal OUT may be reset to a direct-current voltage.

During the second period P2, the control signal Ctrl1 is at a low level (the second level) and does not turn on the first control element 126 and the switch element 221, and the control signal Ctrl2 is at a high level (the first level) and turns on the second control element 128 and the switch element 222. Since the amplifier circuit has the structure of a negative feedback circuit, based on the principle of a virtual short-circuit, the voltage at the inverting input terminal IN2 is the same as a voltage at the non-inverting input terminal IN1, and is equal to the ground voltage. At this time, positive charges at the left endpoint of the second storage capacitor C2 flow to the ground, and negative charges at the right endpoint of the second storage capacitor C2 flow to the right endpoint of the first storage capacitor C1. Therefore, the positive charges at the left endpoint of the first storage capacitor C1 are doubled, accordingly doubling the data voltage VD at the node N1. Therefore, the data voltage VD is amplified and a stable reverse voltage is generated at the output terminal OUT, and the diode D3 in the tunable element 124 is operated at a stable reverse voltage. Therefore, the junction of the diode D3 forms a stable reverse-bias capacitor C3, ensuring normal operation of subsequent circuits coupled to the tunable element 124.

In summary of the foregoing, in the embodiments of the disclosure, the electronic device includes an amplifier circuit and a tunable element. The amplifier circuit is a negative feedback circuit, and the tunable element is electrically connected to the output terminal of the amplifier circuit. The tunable element may include a diode. The amplifier circuit may stabilize the voltage across the tunable element operating at a reverse bias voltage through the negative feedback circuit to accurately control the equivalent capacitance of the tunable element and reduce variability of the equivalent capacitance.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device comprising:
    an amplifier circuit comprising a non-inverting input terminal, an inverting input terminal, and an output terminal, the output terminal being electrically connected to the inverting input terminal, such that the amplifier circuit is a negative feedback circuit;
    a tunable element electrically connected to the output terminal of the amplifier circuit;
    a first control element for receiving a data voltage provided by a data line; and
    a first storage capacitor electrically connected between the first control element and the amplifier circuit,
    wherein the first control element is controlled by a first control signal, and the first control signal comprises a first period and a second period,
    wherein the first control signal is at a first level and turns on the first control element during the first period; and the first control signal is at a second level and does not turn on the first control element during the second period.

2. The electronic device according to claim 1, further comprising:
    a substrate comprising an active area and a peripheral area, the peripheral area being adjacent to the active area;
    a pixel circuit disposed in the active area on the substrate; and
    the data line disposed in the active area on the substrate, wherein the pixel circuit comprises the amplifier circuit, the tunable element, the first control element, and the first storage capacitor.

3. The electronic device according to claim 2, wherein the pixel circuit further comprises:
    a second control element electrically connected to a ground voltage; and
    a second storage capacitor electrically connected between the second control element and the amplifier circuit.

4. The electronic device according to claim 3, wherein the second control element is controlled by a second control signal, and the second control signal comprise the first period and the second period.

5. The electronic device according to claim 4, wherein the second control signal is at the second level and does not turn on the second control element during the first period.

6. The electronic device according to claim 5, wherein the second control signal is at the first level and turns on the second control element during the second period.

7. The electronic device according to claim 1, wherein a voltage at the output terminal of the amplifier circuit is reset to a direct-current voltage during the first period.

8. The electronic device according to claim 1, wherein the tunable element comprises a varactor.

9. The electronic device according to claim 1, wherein the tunable element comprises a radio frequency component.

10. An electronic device comprising:
- an amplifier circuit comprising a non-inverting input terminal, an inverting input terminal, and an output terminal, the output terminal being electrically connected to the inverting input terminal, such that the amplifier circuit is a negative feedback circuit; and
- a tunable element electrically connected to the output terminal of the amplifier circuit;
- a first control element for receiving a data voltage provided by a data line; and
- a first storage capacitor electrically connected between the first control element and the amplifier circuit;
- a second control element electrically connected to a ground voltage; and
- a second storage capacitor electrically connected between the second control element and the amplifier circuit.

11. The electronic device according to claim 10, wherein the first control element is controlled by a first control signal, the second control element is controlled by a second control signal, and the first control signal and the second control signal comprise a first period and a second period.

12. The electronic device according to claim 11, wherein the first control signal is at a first level and turns on the first control element during the first period, and the second control signal is at a second level and does not turn on the second control element during the first period.

13. The electronic device according to claim 12, wherein the first control signal is at the second level and does not turn on the first control element during the second period, and the second control signal is at the first level and turns on the second control element during the second period.

14. The electronic device according to claim 11, wherein a voltage at the output terminal of the amplifier circuit is reset to a direct-current voltage during the first period.

15. The electronic device according to claim 10, wherein the first control element is controlled by a first control signal, and the first control signal comprises a first period and a second period,
wherein the first control signal is at a first level and turns on the first control element during the first period; and the first control signal is at a second level and does not turn on the first control element during the second period.

16. The electronic device according to claim 10, wherein the tunable element comprises a varactor.

17. The electronic device according to claim 10, wherein the tunable element comprises a radio frequency component.

* * * * *